April 14, 1959

O. W. MARSH 2,882,077

MOLDED PLASTIC ROTOR HUB TIGHTENING AND
DRIVING CONSTRUCTION

Filed Feb. 1, 1954

INVENTOR.
ORLO W. MARSH,
BY Justin W. Macklin
ATTY

United States Patent Office 2,882,077
Patented Apr. 14, 1959

2,882,077

MOLDED PLASTIC ROTOR HUB TIGHTENING AND DRIVING CONSTRUCTION

Orlo W. Marsh, Elyria, Ohio, assignor to The General Industries Company

Application February 1, 1954, Serial No. 407,254

6 Claims. (Cl. 287—53)

This invention relates to plastic molded wheels, fan impellers, gears, pulleys, etc. having hubs drivingly fitted upon rotating shafts.

The general object of this invention is to utilize established and proven practices of thermoplastic molding in the manufacture of such rotors, in the provision for and permanent mounting of the rotating part upon the driving shaft or spindle without the use of inserts or added elements such as metal hubs, whereby the time and expense of manufacture is reduced, and while meeting the exacting requirements for which such parts are used.

More specifically, the object of the present invention is to provide molded integral hubs of such a rotor with a driving shoulder or surface, such as a flat segmental portion, and in which novel means is incorporated for tightening the hub shaft receiving socket and for maintaining a tight fit and true axial alignment of the hub and radial and cylindrical part or parts carried by the hub.

The thermoplastic material is of such a nature that it may permanently maintain its finished shape, and yet it has an inherent resiliency. It also has a characteristic of slight shrinkage when cooling from the molding temperature.

The present invention utilizes the characteristic of inherent resiliency, and while compensating for shrinkage, provides for tightening and locking elements being molded into the shaft receiving socket of the hub without interfering with the operation of molding, ejection and removal of the hub and associated parts from the dies.

A further important object is to so utilize these characteristics of the material and the construction as to provide novel means for locking the rotor hub against longitudinal movement on the shaft, thus avoiding the need for added parts, such as set screws, and at the same time avoiding any additional machine operations. It follows that resulting advantages include eliminating the difficulties encountered and the expense of providing and molding of a metal hub into position in such a rotary element or part with consequent saving of expense of preparation and assembly, while attaining rapid and simple molding operation.

In the drawings of an illustrative embodiment:

Fig. 5 is a still further enlarged fragmentary sectional detail of a portion of the spindle and hub, showing the depressed condition of a tightening element.

Figure 1:
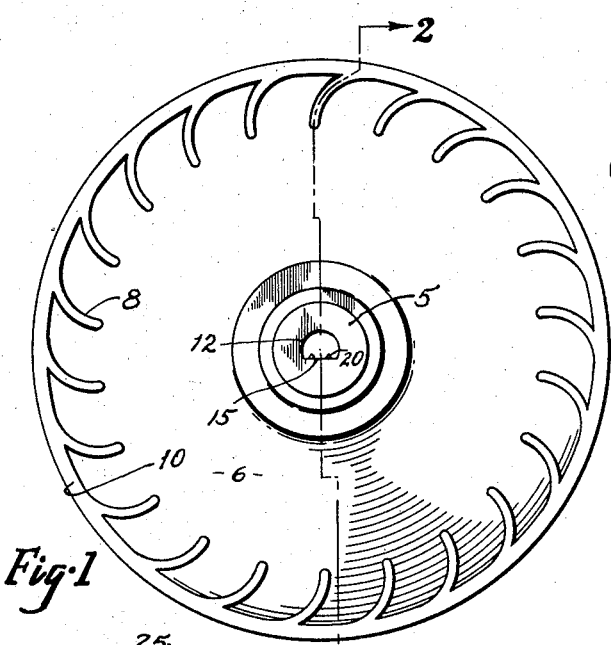
Fig. 1 is an end elevation of a centrifugal blower wheel or impeller formed by thermoplastic injection molding in one integral piece comprising a hub, end wall, impeller blades and a reinforcing ring.

The impeller wheel illustrated is designed to be molded in one piece from plastic material, and in a two-part die from which the finished piece may be readily removed upon separation of the dies and by actuation of ejecting pins. Such a two-part die and its operation is of a general nature well understood in the plastic molding industry. A novel form of such a die construction for the particular form of impeller, which has curved blades extending from a hub at one end to a reinforcing ring at the other, is illustrated and claimed in a copending application of William E. Foster, Serial No. 345,867, filed March 31, 1953, now abandoned.

The impeller wheel shown comprises a hub 5, and an integral outwardly extending end wall 6 preferably flaring somewhat in a flat conical shape toward the plane at the outer end of the hub. Near its perimeter the disk 6 is connected with impeller blades 8 extending parallel to the axis and at their ends opposite the hub plate or disk these blades are connected with a reinforcing integral ring 10.

It will be noted that the inner periphery of the ring 10 is outside of the periphery of the end wall 6 and also outside of the outer edges of the blades to which it is connected, wherefore, a two-part mold may be used for injection molding of the complete part. Special construction of such a mold, as set forth in the above-mentioned Foster application, permits forming the desired and correct curvature of the blades 8 as appears in Fig. 1.

For many practical uses such impeller wheels may be an inch or two up to ten or twelve or more inches in diameter, while being self-supporting, lightweight, economical of material and capable of maintaining true shape and rotational balance at reasonably high speeds.

Assuming, for convenience of illustration, that such an impeller is four to five inches in diameter, the length of the hub 5, mounted in the position shown with relation to the blades, may be one-half to three-fourths of an inch in length. The hub may have a spindle receiving opening 12 adapted to fit a spindle or drive shaft of say approximately one-fourth of an inch in diameter. The spindle usually has a flattened surface engaged by a set screw or like holding and driving means. In the present novel arrangement a flat surface 15 in the hub socket is formed in a segmental plane parallel with the axis and fits against the flat surface of the shaft and thus serves as a driving surface.

The opening 12 in the hub is formed around a projection rigid with one of the mold members and is withdrawn as the formed impeller wheel is removed from the mold.

It is common practice, of course, to remove the impeller before the complete cooling and hardening has been effected; thus, in addition to the normal resiliency of the material under normal room temperature conditions, there is temporarily a greater yielding factor or condition at the time that the projection forming the spindle receiving opening in the hub is withdrawn. Correspondingly, the resulting shrinkage is not yet completed.

It has been observed that while the shrinkage is quite uniform in amount, the diameter of the spindle opening is enlarged upon cooling. I have found that there is a slight variation tending to enlarge the diameter intermediately of the ends of the spindle or shaft opening at its middle zone. For example, in the approximately one-quarter inch spindle opening, there may be a variation of from one to three-thousandths of an inch in diameter, and it can be observed that there is a slight outward curvature of the flat surface 15 at its middle portion before it is fitted tightly onto its complementary flat spindle surface.

With these conditions in mind, locking and pressure effecting tightening elements are designed to compensate for the full shrinkage and to effect close fitting, true alignment of the hub on the spindle, as will presently appear.

Intermediately of the ends of the flat surface 15, I form elongated inwardly projecting ribs 20, by providing corresponding grooves or cavities in the surface of a stud carried by the mold and acting to form the bearing opening 12. These pressure creating ribs 20 are shown as curved at their ends and as spaced apart and extending longitudinally substantially parallel with the axis of the hub. In the illustrative size of spindle opening (i.e., about one quarter of an inch) these pressure ribs rise to a height of ten or twelve thousandths of an inch.

Figure 4:
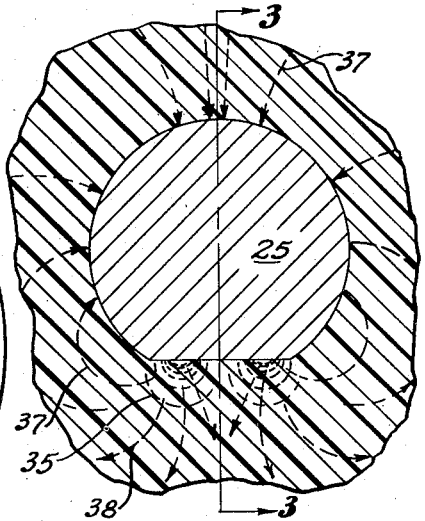
Fig. 4 is a still further enlarged section taken at right angles to Fig. 3 and indicating the tightening forces by arrows.
Figure 2:
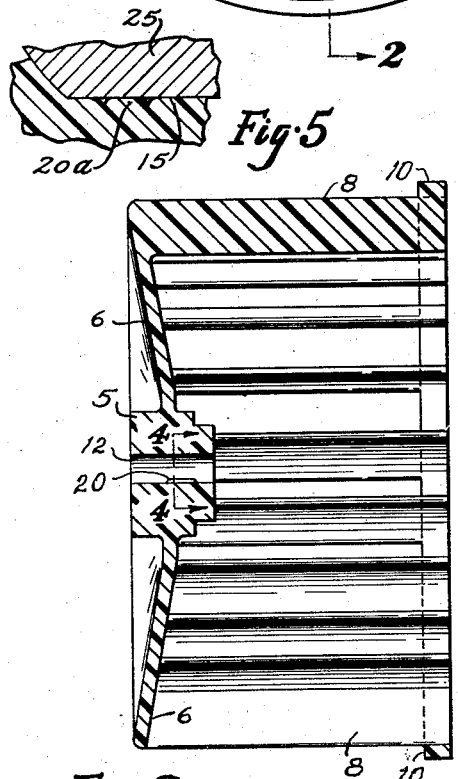
Fig. 2 is a section taken along offset and curved lines 2—2 of Fig. 1.

As shown, these ribs 20 are preferably beveled each way from an edge, as appears in Fig. 4. Upon removal of the injection-formed piece of the mold these are depressed somewhat along with the material of the surrounding area and slide outwardly from the grooves or cavities in which they are formed.

When the material has hardened, and at any time later, the hub opening may be forced upon a closely fitting spindle 25 having a flattened driving surface corresponding to the surface 15 in the hub opening. The action of these pressure creating ribs is as follows: they pull the hub tightly against the cylindrical surface around one-half or more of the supporting and driving spindle and around the semi-cylindrical zone opposite to that of the flattened portion and the pressure elements. These elements or ribs are naturally distorted into somewhat flattened condition and also are pressed by the flat surface of the spindle into the surrounding material in the adjacent part of the hub body, as illustrated in the enlarged view in Fig. 5 at 20a.

The natural resiliency, however, of the material maintains a continuous and permanent effective pressure acting to hold the major portion of the hub surface in very tight fitting engagement and thus in parallel axially aligned relation to the spindle. A portion of the flattened surface 15 is, of course, tightly fitted to the corresponding flattened surface of the spindle or shaft 25 carrying the impeller fan element.

In the proportions and dimensions given a tolerance of perhaps two or three one-thousandths of an inch between the flat surface 15 and the opposite side of the shaft opening cylindrical portion is expected and permitted. Correspondingly, a yielding effect of the flat surface and increased localized pressure of the ribs effects a fitting upon the driving shaft comparable to something less than one-thousanth of an inch variation, and in any event, it is at all times tight and in axial alignment. Correspondingly, the end wall or disk 6 and blades 8 are held in true relative radial and circumferential positions.

The location and number of pressure effecting protuberances (such as 20) is a matter of selection and design, but preferably their location is such that the maximum pull effected against the flat driving surface of the carrying shaft is between the ends of the hub to assure axial hub alignment and true radial running of the disk 6 and blades 8.

Likewise, the height and area of these pressure effecting protuberances should be such as to compensate for the shrinkage described while not impeding the ejecting or damaging of the still somewhat soft molded wheel or rotor hub when the mold is separated for removal. Thus, the hub portion, if proportioned and molded as described, may be slid off from the stud or spindle forming the hub opening and with the protuberances momentarily yielding and without appreciably adding to the force required for ejection of the part.

In Fig. 5 is diagrammatically shown the condition of a pressure rib when the flat of the spindle 25 is in position, pressing tightly against the surface 15 of the hub. It will be noted that the material of the protuberance 20a has been pressed downwardly into the adjacent material of the hub from its position shown by the dot and dash line 20c of Fig. 3.

Figure 3:
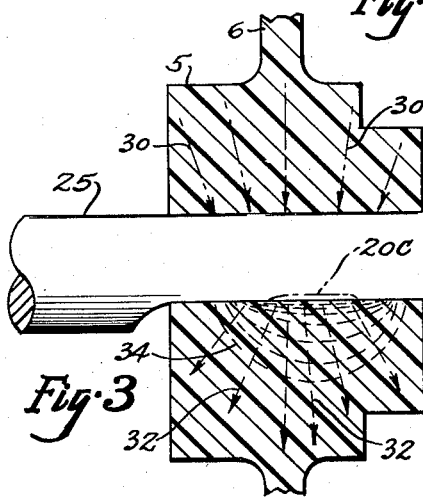
Fig. 3 is an enlarged sectional detail through the hub showing it in position on the shaft and having arrows indicating the tightening forces.

From experience and study I have found that the effective forces thus exerted to bring the cylindrical portion of the hub socket into engagement with the carrying and driving spindle 25, may be reasonably understood to be somewhat as indicated by the broken line arrows 30 of Fig. 3, while the pulling pressure may be indicated to be distributed and acting in the directions indicated by the broken lines 32. The resilient pressure and action within the hub may be considered to be distributed somewhat as indicated by the curved lines 34 of Fig. 3. Similar pressure distribution within the hub body along the zone of each pressure rib is indicated in Fig. 4 by curved broken lines as at 35.

The resulting applied pressure on the cylindrical surface extends substantially around the cylindrical surface within the hub against the spindle 25, as indicated in Fig. 4 by the broken line arrows 37, while the pulling pressure resulting from distortion of the ribs is again illustrated by the broken line arrows 38.

It will be seen that with the rotor thus held in true alignment and very tightly frictionally engaging the tightening and driving spindle, there may be many uses not requiring other means for preventing longitudinal shifting of the hub on the spindle. However, where metal hubs are used, collars or set screws are also required, adding to expense.

Utilizing the same factors and characteristics of resiliency above described, I may provide a unique and effective means for locking the hub against longitudinal movement on the spindle, and with no added expense or additional mechanical parts.

Figures 6, 7:
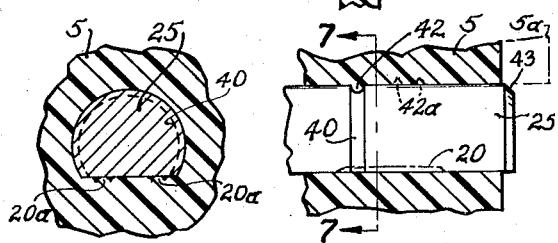
Fig. 6 is a fragmentary view on the same scale as Fig. 3 showing the rib and groove arrangement for preventing longitudinal movement of the hub on the shaft.
Fig. 7 is a section through the spindle and adjacent portion of the hub taken on a plane indicated by the line 7—7 in Fig. 6.

In machining the spindle 25, and at the same time with forming a chamfer or bevel at the end, as shown in Fig. 6, in the same operation a groove 40 may be formed in a position to be located within the hub 5 to be carried thereby. The stud member on the mold forming the hub opening 12 may have formed thereon a similar groove whereby the material of the hub has molded within the hub socket a transverse rib 42 (Fig. 6) at the desired position, preferably between the ends of the hub.

The condition of resiliency described, at the time of removal of the molded part from the mold, permits the hub socket with the transverse rib 42 to be removed in the same manner and by reason of the same yielding as described in connection with the longitudinal ribs 20. The height of the rib need only be such that it projects inwardly a few thousandths of an inch to be very effective when engaging the edges of the groove 40 in the carrying spindle. As shown, the proportions are enlarged for clearness of illustration, but, for example, the rib need only be eight or ten-thousandths of an inch in radial height. If desired, two or more such ribs may be used, although I have found one is sufficient for practical purposes.

Having formed the rib 42, it yields outwardly as it is pressed over the bevel 43 shown in Fig. 6 at the end of the spindle 25, this rib being actually displaced outwardly within the hub diameter, as indicated by the broken lines at 42a, as the hub moves along the spindle, and further indicated by the broken lines 5a, to the position desired, and indicated by the solid lines in Fig. 6. When in position, the flat surfaces of the spindle and hub are tightly engaged with the pressure creating ribs functioning as previously described, and with the rib 42 effecting a locking engagement, insuring the holding of the hub in the desired longitudinal position on the spindle.

From the foregoing description, it will be seen that effective tight aligning and driving engagement with longitudinal locking of the rotor on the carrying shaft is attained without any additional operation or the use of any additional mechanical parts by the rotor.

Having thus described my invention, what I claim is:

1. An integral one-piece fan impeller wheel of plastic material having a hub with an axial shaft embracing opening comprising a cylindrical portion for the greater part of its circumference and a single segmental flat surface and adapted to embrace complementary cylindrical and flat surfaces of a supporting and driving shaft, the material of the wheel and hub being of a normally rigid but inherently resilient material, and the hub having means for effecting a tight engagement of the cylindrical surface comprising integrally molded inwardly projecting material on the zone of the flat surface within the hub bore and said inwardly projecting material extending from its adjacent surface a distance only sufficient to permit it to be distorted and pressed substantially into the surrounding hub material by the flat surface of said shaft when the hub is in position on the shaft whereby the resiliency of the thus distorted material may exert pressure outwardly radially and act to draw the cylindrical surface into tight engagement with the shaft.

2. The one-piece fan impeller wheel described in claim 1 in which said inwardly projecting material comprises parallel ribs of a height between one-tenth to one-fiftieth of the diameter of the hub bore.

3. The impeller wheel described in claim 1 in which the inwardly projecting pressure exerting material comprises small separated longitudinal ribs formed on the segmental flat surface and in which said flat surface extends across a distance of between thirty to ninety degrees of the shaft circumference.

4. An integral one piece fan impeller wheel of molded plastic material having a hub provided with an axially extending shaft-embracing opening comprising a cylindrical surface and a flat segmental surface, and adapted to embrace complementary cylindrical and flat surfaces of a supporting and driving shaft, the material of the wheel and hub being normally rigid but inherently resilient, means for tightening and axially aligning the hub and wheel on the shaft embraced thereby, comprising a longitudinally extending rib portion projecting innwardly within the hub opening and adapted to be substantially completely depressed into the surrounding material when the hub is forced onto the shaft, and to act resiliently to draw the hub surface tightly to the opposite side of the shaft, and said hub opening having a transverse rib of inwardly projecting height, such that it may be depressed into the surrounding material when passed over the shaft surface, and said transverse rib being adapted to engage a shoulder formed in the shaft whereby the wheel may be held against inadvertent longitudinal movement on the shaft.

5. The impeller wheel defined in claim 4 in which the transverse inwardly projecting rib extends circumferentially within the hub opening and is adapted to engage a circumferential groove in the shaft, and is of a height such that it may be depressed into the surrounding hub material for substantially its full radially inwardly projecting height.

6. The impeller wheel defined in claim 4 in which the means for tightening and axially aligning the hub and wheel includes a second rib portion spaced from said first mentioned rib portion, said rib portions rising inwardly from the segmental flat surface, said ribs being transversely spaced apart and extending longitudinally within the hub opening and for less than the length of the hub opening and being positioned intermediately of the ends of the hub opening, whereby resilient radial pressure against the shaft is exerted by said ribs at a zone between the ends of the hub.

References Cited in the file of this patent

UNITED STATES PATENTS

| | | |
|---|---|---|
| 2,013,771 | Tompkins | Sept. 10, 1935 |
| 2,171,361 | Gits et al. | Aug. 29, 1939 |
| 2,283,905 | Beal | May 26, 1942 |
| 2,401,816 | De Gray | June 11, 1946 |
| 2,443,249 | Jackson | June 15, 1948 |
| 2,644,978 | Becker | July 14, 1953 |
| 2,649,803 | Andre | Aug. 25, 1953 |
| 2,663,263 | Mayus et al. | Dec. 23, 1953 |